US008031243B2

(12) United States Patent
Imai et al.

(10) Patent No.: US 8,031,243 B2
(45) Date of Patent: Oct. 4, 2011

(54) APPARATUS, METHOD, AND MEDIUM FOR GENERATING IMAGE

(75) Inventors: Francisco Imai, Mountain View, CA (US); Won-hee Choe, Gyeongiu-si (KR); Jae-hyun Kwon, Yongin-si (KR); Seong-deok Lee, Suwon-si (KR); Sung Ho Park, San Jose, CA (US)

(73) Assignee: Samsung Electronics Co., Ltd., Suwon-Si (KR)

(*) Notice: Subject to any disclaimer, the term of this patent is extended or adjusted under 35 U.S.C. 154(b) by 793 days.

(21) Appl. No.: 11/822,551

(22) Filed: Jul. 6, 2007

(65) Prior Publication Data

US 2009/0009654 A1    Jan. 8, 2009

(51) Int. Cl.
*H04N 9/083* (2006.01)
(52) U.S. Cl. ......... 348/278; 348/273; 348/272; 348/276
(58) Field of Classification Search .............. 348/271, 348/276, 278
See application file for complete search history.

(56) References Cited

U.S. PATENT DOCUMENTS

| | | | | |
|---|---|---|---|---|
| 4,064,532 | A * | 12/1977 | Yamanaka | 348/275 |
| 7,583,303 | B2 * | 9/2009 | Mizukura et al. | 348/266 |
| 2007/0076269 | A1 * | 4/2007 | Kido et al. | 358/474 |

FOREIGN PATENT DOCUMENTS

| | | | |
|---|---|---|---|
| JP | 2000315784 A | * | 11/2000 |
| JP | 2005-234133 | | 9/2005 |
| JP | 2006-211478 | | 8/2006 |
| JP | 2006-340100 | | 12/2006 |
| WO | WO 2006080220 A1 | * | 8/2006 |

* cited by examiner

*Primary Examiner* — David L. Ometz
*Assistant Examiner* — Angel L Garces-Rivera
(74) *Attorney, Agent, or Firm* — Staas & Halsey LLP (57) ABSTRACT

An apparatus, method, and medium for generating an image is provided. The apparatus includes an optical module, a filter module which includes a wide-band filter area that allows transmission of optical signals within a wavelength band corresponding to a color of a predetermined color, a narrow-band filter area that allows transmission of optical signals within a wavelength band corresponding to the predetermined color, and an all-pass filter area that allows transmission of optical signals in all wavelength bands, and an image generation module which generates an image by processing optical signals that transmit through the filter module, wherein the image generation module applies different weights to optical signals according to which of the wide-band filter area, the narrow-band filter area, and the all-pass filter area the optical signals respectively transmit through.

31 Claims, 6 Drawing Sheets
(2 of 6 Drawing Sheet(s) Filed in Color)

APPARATUS, METHOD, AND MEDIUM FOR GENERATING IMAGE

BACKGROUND

1. Field

Embodiments relate to an apparatus, method, and medium for generating an image, and more particularly, to an apparatus, method, and medium for generating an image which can generate a high-dynamic range (HDR) image using an image obtained by a single exposure.

2. Description of the Related Art

In recent years, the distribution of digital cameras and devices equipped with high-resolution cameras such as camera phones has been widespread. These cameras generally include a lens and an image sensor.

Lenses collect light reflected from an object, and image sensors detect light collected by lenses and convert the collected light into electrical image signals. Image sensors are typically solid-state image sensors. Examples of the solid-state image sensors include charge coupled device (CCD) and complementary metal oxide semiconductor (CMOS).

Image sensors of cameras may include a color filter array (CFA) having a mosaic of color filters in which each color filter filters light reaching each pixel. Since image sensors are highly sensitive to near Infra-Red (NIR) light, image sensors of cameras may also include an NIR shield filter which is mounted on a CFA for preventing image discolorations caused by NIR light.

In the case of capturing images in a high-illumination or low-illumination environment or in a sharp contrast environment with backlighting, conventional image sensors using conventional CFAs may not be able to accurately capture color images due to conventional CFAs' inherent limitations in dynamic range. As a result, the rendered image will loose information either in the shadows or in the highlights for high dynamic range (HDR) scenes.

In order to address this problem, high dynamic range (HDR) image sensors capable of accurately capturing images even in a high-illumination or low-illumination environment or in a sharp contrast environment with backlighting have been developed. However, the HDR image sensors are generally expensive sensors mainly used for precision measurement purposes or for security and military purposes and they are not suitable for consumer products due to their cost and complexity.

Conventionally, an HDR image is created by generating a plurality of images with different light exposure amounts. For example, in the case of capturing images of an object in a backlighting state, images obtained with short exposure would capture highlighted area without saturation but dark shadow areas will not be visible, whereas images obtained with long exposure may have visibility in the dark areas but may loose information in bright areas due to saturation. Therefore, HDR images can be obtained by blending the image(s) obtained with short exposure and the image(s) obtained with long exposure.

In order to obtain a long-exposure image, a user must hold the imaging device for a long time, thus compromising user convenience since it would require a tripod and stationary objects. If the position of an object changes during an image capturing operation, a long-exposure image and a short-exposure image obtained by image capturing operation may not be the same, thereby making it difficult to properly generate an HDR image. Also, a user may accidentally shake his/her hand by holding the imaging device for a long time and may thus produce blurred images.

Japanese Patent Laid-Open Publication No. 2006-211478 discloses a method of generating an HDR image from images in which an exposure time is varied according to the sensitivity of filters by appropriately arranging primary color filters with low sensitivity and complementary color filters with high sensitivity. This method, however, may result in blurry images due to a shake in a user's hand during an exposure time and may not improve sensitivity considerably.

SUMMARY

Embodiments provide generating a high-dynamic range (HDR) image by appropriately processing a single image obtained by using a wide-band filter, a narrow-band filter, and an all-pass filter.

In an aspect, there is provided an apparatus including an optical module to collect optical signals, a filter module which includes a wide-band filter area that allows transmission of optical signals within a wavelength band corresponding to a complementary color of a predetermined color, a narrow-band filter area that allows transmission of optical signals within a wavelength band corresponding to the predetermined color, and an all-pass filter area that allows transmission of optical signals in all wavelength bands, and an image generation module to generate an image by processing optical signals that transmitted through the filter module, wherein the image generation module applies different weights to optical signals according to which of the wide-band filter area, the narrow-band filter area, and the all-pass filter area that the optical signals are respectively transmitted through.

In another aspect, there is provided a method including receiving optical signals that are reflected from an object, filtering the received optical signals using a wide-band filter area which allows transmission of optical signals within a wavelength band corresponding to a complementary color of a predetermined color, a narrow-band filter area which allows transmission of optical signals within a wavelength band corresponding to the predetermined color and an all-pass filter area which allows transmission of optical signals in all wavelength bands, and generating an image by processing optical signals obtained by the filtering, wherein the generation comprises applying different weights to the received optical signals according to which of the wide-band filter area, the narrow-band filter area, and the all-pass filter area the received optical signals respectively transmit through.

According to another aspect, there is provided an apparatus for generating an image including a filter module which comprises a wide-band filter area that allows transmission of optical signals within a wavelength band corresponding to a complementary color of a predetermined color, a narrow-band filter area that allows transmission of optical signals within a wavelength band corresponding to the predetermined color, and an all-pass filter area that allows transmission of optical signals in all wavelength bands; and an image generation module to generate an image by processing optical signals transmitted through the filter module, wherein the image generation module applies different weights to optical signals according to which of the wide-band filter area, the narrow-band filter area, and the all-pass filter area that the optical signals are respectively transmitted through.

According to another aspect, there is provided a method for generating an image, the method including filtering optical signals using a wide-band filter area which allows transmission of optical signals within a wavelength band corresponding to a color of a predetermined color, a narrow-band filter area which allows transmission of optical signals within a wavelength band corresponding to the predetermined color, and an all-pass filter area which allows transmission of optical signals in all wavelength bands; and generating an image by processing optical signals obtained by the filtering, wherein the generation comprises applying different weights to the received optical signals according to which of the wide-band filter area, the narrow-band filter area, and the all-pass filter area the received optical signals respectively transmit through.

According to another aspect, there is provided at least one computer readable medium storing computer readable instructions to implement methods of embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and/or other aspects, features and advantages will become apparent and more readily appreciated from the following description of exemplary embodiments, taken in conjunction with the accompanying drawings of which.

DETAILED DESCRIPTION OF EMBODIMENTS

Reference will now be made in detail to exemplary embodiments, examples of which are illustrated in the accompanying drawings, wherein like reference numerals refer to the like elements throughout. Exemplary embodiments are described below by referring to the figures.

Figure 1:
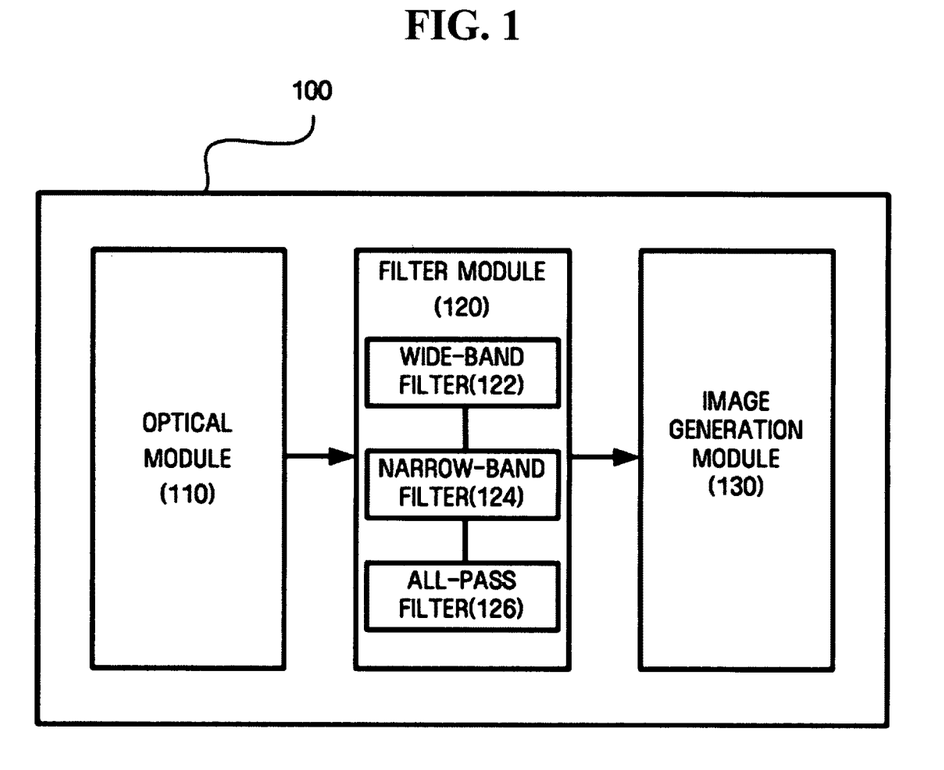
FIG. 1 is a block diagram of an apparatus for generating an image according to an exemplary embodiment.
Figure 2:
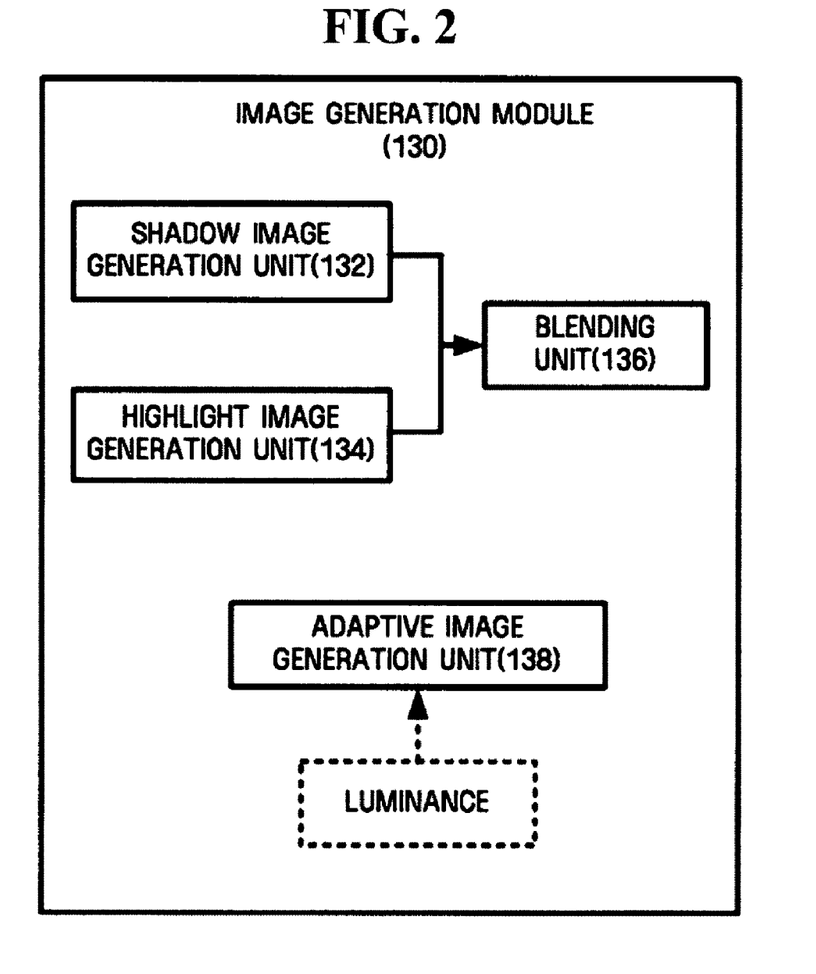
FIG. 2 is a block diagram of an image generation module illustrated in FIG. 1, according to an exemplary embodiment.

FIG. 1 is a block diagram of an apparatus 100 for generating an image according to an exemplary embodiment, and FIG. 2 is a block diagram of an image generation module 130 illustrated in FIG. 1.

Referring to FIG. 1, the apparatus 100 includes an optical module 110, a filter module 120, and the image generation module 130. Referring to FIG. 2, the image generation module 130 includes a shadow image generation unit 132, a highlight image generation unit 134, and a blending unit 136. The image generation module 130 may also include an adaptive image generation unit 138.

The apparatus 100 may be a device such as a digital camera which is capable of storing images of an object with the aid of a solid-state image sensor (such as a charge coupled device (CCD) or a complementary metal oxide semiconductor (CMOS)). The apparatus 100 may also be a camera phone or a personal digital assistant (PDA) which is equipped with a solid-state image sensor, such as a digital camera. However, the apparatus 100 is not restricted to these devices.

Referring to FIG. 1, the optical module 110 collects optical signals reflected from an object. The optical module 110 may include one or more lenses. The number of lenses may be varied according to the purpose of use. A plurality of lenses may be arranged in the optical module 110 in various manners. The apparatus 100 can improve the sensitivity from a single image captured by the optical module 110 and, at the same time, can generate a high-dynamic range (HDR) image. Assume that the optical module 110 is comprised of a single lens. The optical module 110 may be construed as being a lens.

The filter module 120 filters optical signals via the optical module 110 and allows the transmission of optical signals within a predetermined wavelength band.

Typical filtering operations by a primary color filter and a complementary color filter will hereinafter be described in detail with reference to FIG. 3.

Figure 3A:
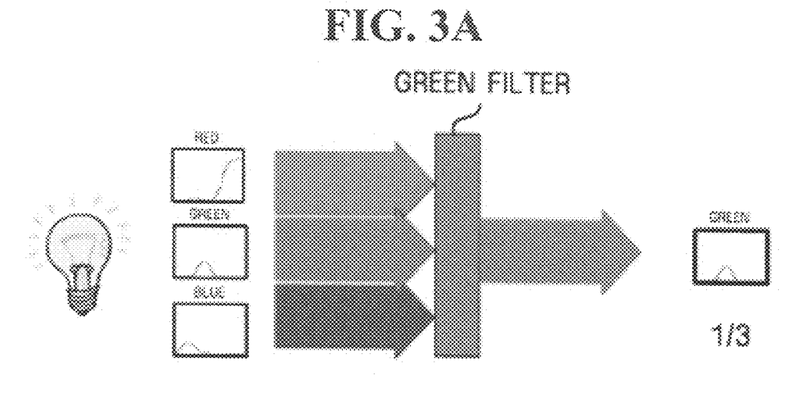
FIGS. 3A and 3B illustrate typical filtering operations respectively by a primary color filter and a complementary color filter.
Figure 3B:
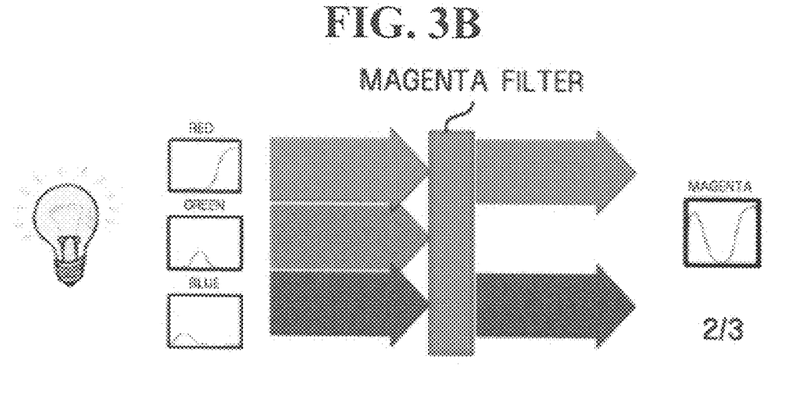

FIGS. 3A and 3B illustrate a typical filtering operation by a primary color filter and a complementary color filter. More specifically, FIG. 3A illustrates a filtering operation that involves the use of a green (G) filter of a primary color filter, and FIG. 3B illustrates a filtering operation that involves the use of a magenta (M) filter of a complementary color filter. Referring to FIG. 3A, a G filter allows the transmission of optical signals corresponding to G, which account for only a third of all optical signals incident upon the G filter, and restricts the transmission of the rest of the incident optical signals corresponding to red (R) and blue (B), thereby providing low sensitivity. Referring to FIG. 3B, an M filter restricts the transmission of optical signals corresponding to G and allows the transmission of optical signals corresponding to R and B, which account for two thirds of all optical signals incident upon the M filter, thereby providing higher sensitivity than in FIG. 3A. There is a trade-off between light sensitivity and color purity. Using narrower band filters such as (R), (G) and (B) leads to better spectral selectivity ensuring better color reproduction but it compromises sensitivity. In the other hand, using broader band filters such as magenta (M), cyan (C) and yellow (Y) there are gain in sensitivity but the less selective broader filters will result in more desaturated colors.

Referring to FIG. 1, the filter module 120 may include a wide-band filter area 122 which allows the transmission of optical signals within a wavelength band corresponding to a complementary color of a predetermined color, a narrow-band filter area 124 which allows the transmission of optical signals within a wavelength band corresponding to the predetermined color, and an all-pass filter area 126 which allows the transmission of optical signals in all wavelength bands. The filter module 120 may also include an infrared (IR) shield filter (not shown) which blocks the transmission of optical signals within an IR band.

The wide-band filter area 122 may include a complementary color filter which is of a complementary color of R, G or B, for example, a cyan (C), magenta (M), or yellow (Y) filter. The narrow-band filter area 124 may include a primary color filter which is of a primary color such as R, G, or B. An optical signal obtained by filtering by a complementary color filter and a primary color filter may be an optical signal which IR components are removed using an IR shield filter.

The all-pass filter area 126 may include a white (W) filter which allows the transmission of optical signals in all wavelength bands. However, the all-pass filter area 126 is not restricted to this. The all-pass filter area 126 may not include any filter, and may thus allow the transmission of optical signals in all wavelength bands. Since the all-pass filter area 126 allows the transmission of all optical signals regardless of the wavelength bands of the optical signals, it is possible to increase the amount of light that arrives at a predetermined pixel and thus to improve sensitivity. An optical signal obtained by filtering performed by a W filter, i.e., the all-pass filter area 126, may include near infra-red (NIR) components.

A solid-state image sensor is highly sensitive to NIR light and may thus result in blurry, discolored, and/or foggy images. In order to address this, the filter module 120 may include an IR shield filter (not shown) which blocks the transmission of optical signals for NIR radiation.

Figure 4:
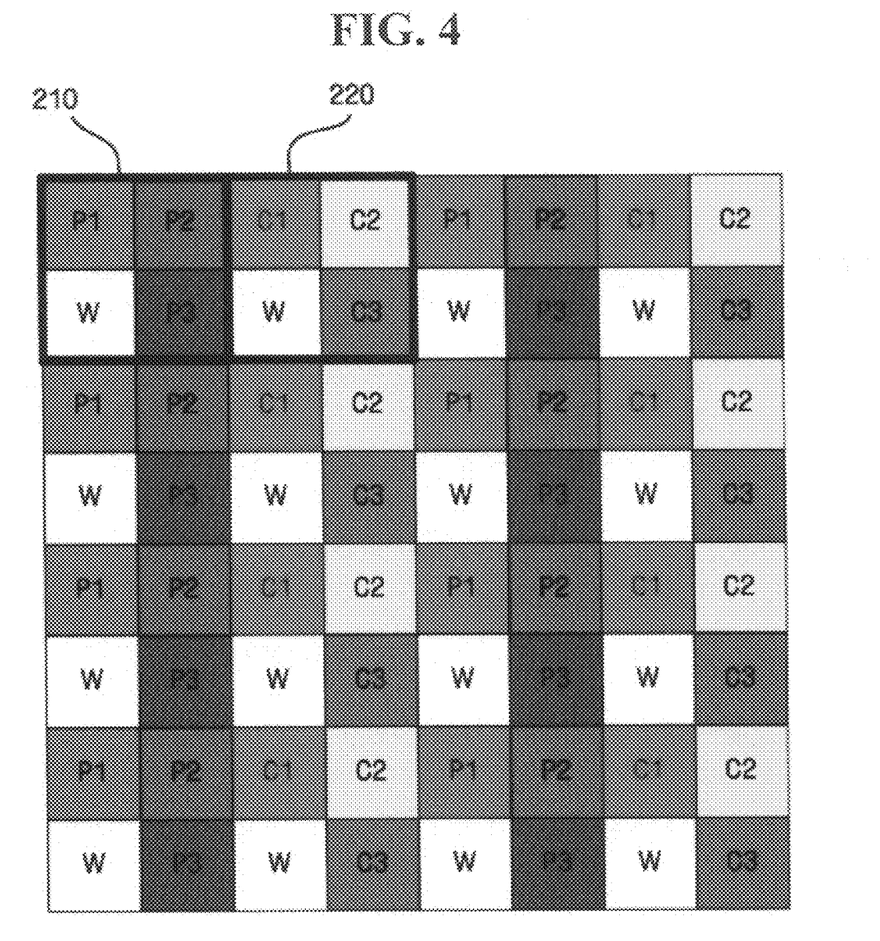
FIG. 4 illustrates a filter module including a plurality of wide-band filter areas, a plurality of narrow-band filter areas, and a plurality of all-pass filter areas, according to an exemplary embodiment.

FIG. 4 illustrates the filter module 120 illustrated in FIG. 1, according to an exemplary embodiment. Referring to FIG. 1, the filter module 120 includes the wide-band filter area 122, the narrow-band filter area 124, and the all-pass filter area 126. Referring to FIG. 4, narrow-band filters P1, P2, and P3 correspond to the narrow-band filter area 124, wide-band filters C1, C2, and C3 correspond to the wide-band filter area 122, and White filters W correspond to the all-pass filter area 126. The narrow-band filters P1, P2, and P3 may be respectively represented by R, G, and B filters, and the wide-band filters C1, C2, and C3 may be respectively represented by C, M, and Y filters.

The filter module 120 may include a plurality of filters respectively corresponding to a plurality of pixels. That is, the filter module 120 may include a plurality of complementary color filters, primary color filters, and W filters respectively corresponding to a plurality of pixels. FIG. 4 illustrates part of the filter module 120, and the filter module 120 may be expanded according to the number of pixels and resolution. That is, the filter module 120 may be expanded vertically or horizontally with respect to a predetermined pixel in a solid-state image sensor.

Referring to FIG. 4, the filter module 120 include the wide-band filters C1, C2, and C3 which correspond to the wide-band filter area 122, the narrow-band filters P1, P2, and P3 which correspond to the narrow-band filter area 124, and the W filters which correspond to the all-band filter area 126. The filter module 120 may include a plurality of 4*2 pixel regions, each 4*2 pixel region consisting of a first pixel region 210 and a second pixel region 220. The first pixel region 210 is a 2*2 pixel region including the narrow-band filters P1, P2, and P3 and the W filter W, and the second pixel region 220 is a 2*2 pixel region including the wide-band filters C1, C2, and C3 and the W filter W.

Referring to FIGS. 1 and 2, the image generation module 130 generates an image by sensing and processing optical signals that transmit through the filter modules 120. The image generation module 130 may apply different weights to the wide-band filter area 122 and the narrow band filter area 124 of the filter module 120. Alternatively, the image generation module 130 may apply different weights to the first filter region 210 and the second filter region 220.

Referring to FIG. 2, the image generation module 130 includes a shadow image generation unit 132, a highlight image generation unit 134, and a blending unit 136.

The shadow image generation unit 132 generates a demosaicked image by applying a greater weight to optical signals that transmit through the second filter region 220 and then are sensed by a solid-state image sensor than to optical signals that transmit through the first filter region 210 and then are sensed by the solid-state image sensor. That is, the shadow image generation unit 132 generates a shadow image with improved hues by applying a greater weight to the second filter region 220, which has higher sensitivity than to the first filter region 210 including a plurality of narrow-band filters (124).

The highlight image generation unit 134 generates a demosaicked image by applying a greater weight to optical signals that transmit through the first filter region 210 and then are sensed by the solid-state image sensor than to optical signals that transmit through the second filter region 220 and then are sensed by the solid-state image sensor. That is, the highlight image generation unit 134 generates a highlight image with sharp edges by applying a greater weight to the first filter region 210, which has lower sensitivity than the second filter region 220 including a plurality of wide-band filters (122).

In order to generate a shadow image and a highlight image, a demosaicking operation may be performed by applying different weights to a single image, instead of capturing a plurality of images through multiple exposures and demosaicking each of the captured images.

The blending unit 136 generates an HDR image by blending the shadow image generated by the shadow image generation unit 132 and the highlight image generated by the highlight image generation unit 134. Since the first filter region 210 and the second filter region 220 both includes a W filter and W filters allow the transmission of optical signals in all wavelength bands, it is possible to improve the sensitivity of images.

The image generation module 130 may perform subsequent processes such as color conversion, white balancing, and gamma correction on the HDR image, and display an image obtained by the subsequent processes with the aid of a display module (not shown).

In a sharp contrast scene caused by backlighting, HDR image may be generated using the shadow image generation unit 132, the highlight image generation unit 134, and the blending unit 136.

Referring to FIG. 2, the image generation module 130 may include the adaptive image generation unit 138.

The adaptive image generation unit 138 generates a luminance image with the aid of a solid-state image sensor, and generates an image by performing a demosaicking operation while varying a weight applied to optical signals that transmit through the wide-band filter area 122 or a weight applied to optical signals that transmit through the narrow-band filter area 124 according to the luminance of the luminance image.

More specifically, if the luminance image has a low luminance, the adaptive image generation unit 138 may generate an image by applying a greater weight to optical signals that transmit through the wide-band filter area 122 than to optical signals that transmit through the narrow-band filter area 124. On the other hand, if the luminance image has a high luminance, the adaptive image generation unit 138 may generate an image by applying a greater weight to optical signals that transmit through the narrow-band filter area 124 than to optical signals that transmit through the wide-band filter area 122. Alternatively, the adaptive image generation unit 138 may apply a greater weight to the second filter region 220 than to the first filter region 210 if the luminance image has a low luminance; and may apply a greater weight to the first filter region 210 than to the second filter region 220 if the luminance image has a high luminance.

The luminance image may be an image generated by optical signals that transmit through a W filter, a Y filter, and a G filter. Luminance may be estimated using the luminance image or using optical signals that transmit through the all-pass filter area 126.

The adaptive image generation unit 138 may generate a HDR image in a low-illumination environment or a high-illumination environment. More specifically, in a low-illumination environment, the adaptive image generation unit 138 may generate an image by applying a greater weight to the wide-band filter area 122 than to the narrow-band filter area 124. On the other hand, in a high-illumination environment, the adaptive image generation unit 138 may generate an image by applying a greater weight to the narrow-band filter area 124 than to the wide-band filter area 122.

Various subsequent processes such as color conversion, white balancing, and gamma correction may be performed on an image obtained by a demosaicking operation performed by the adaptive image generation unit 138, and an image obtained by the subsequent processes may be displayed by a display module (not shown).

Figure 5:
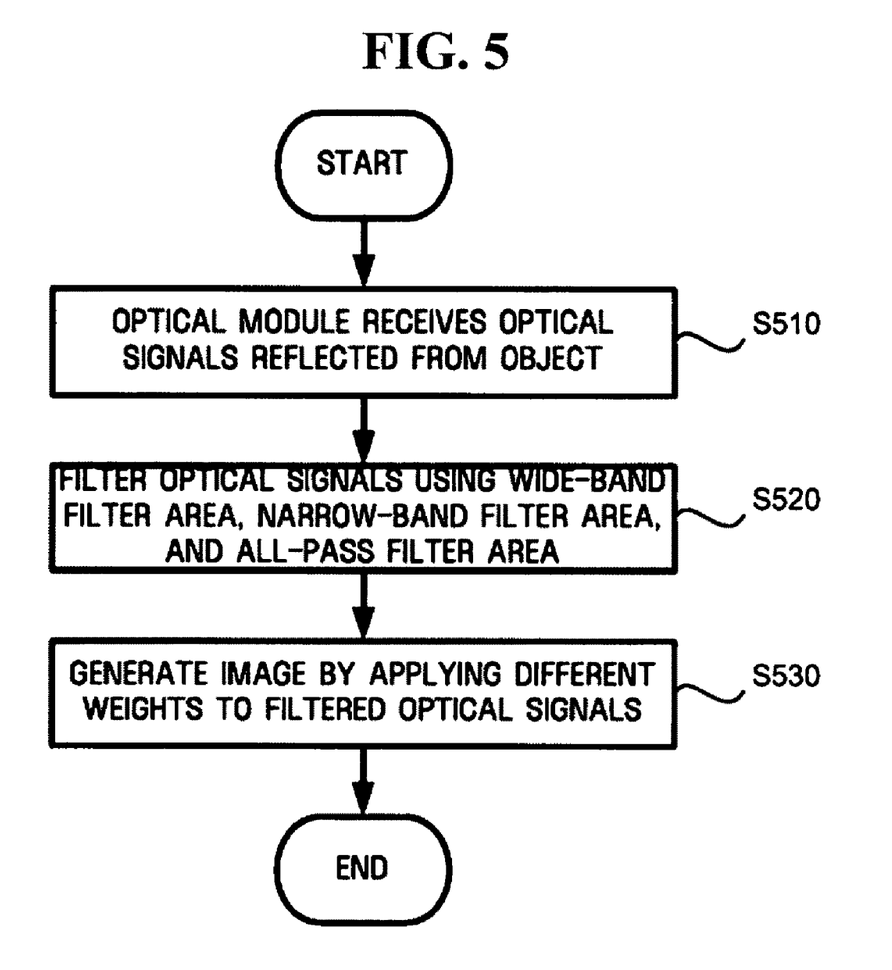
FIG. 5 is a flowchart illustrating a method of generating an image according to an exemplary embodiment.
Figure 6:
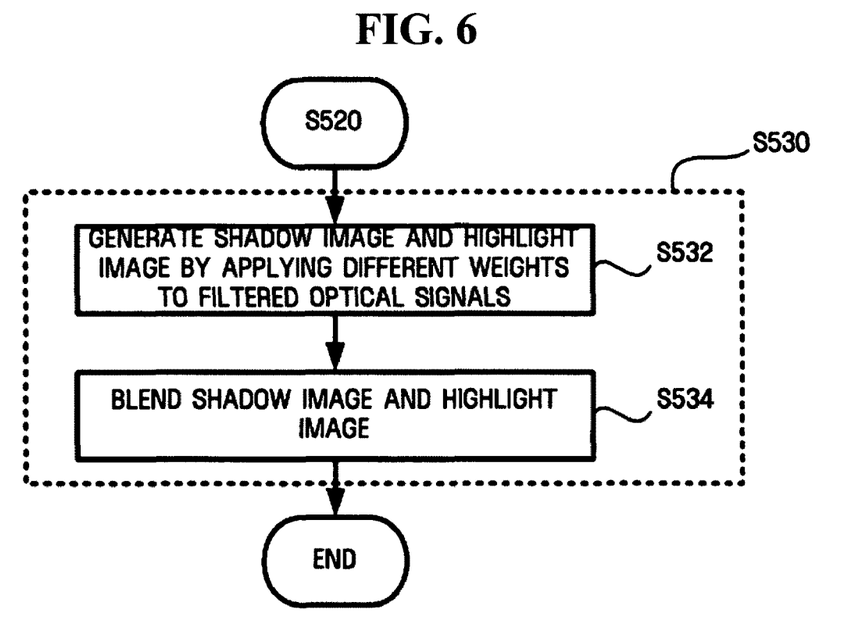
FIG. 6 is a flowchart illustrating operation S530 of FIG. 5, according to an exemplary embodiment.
Figure 7:
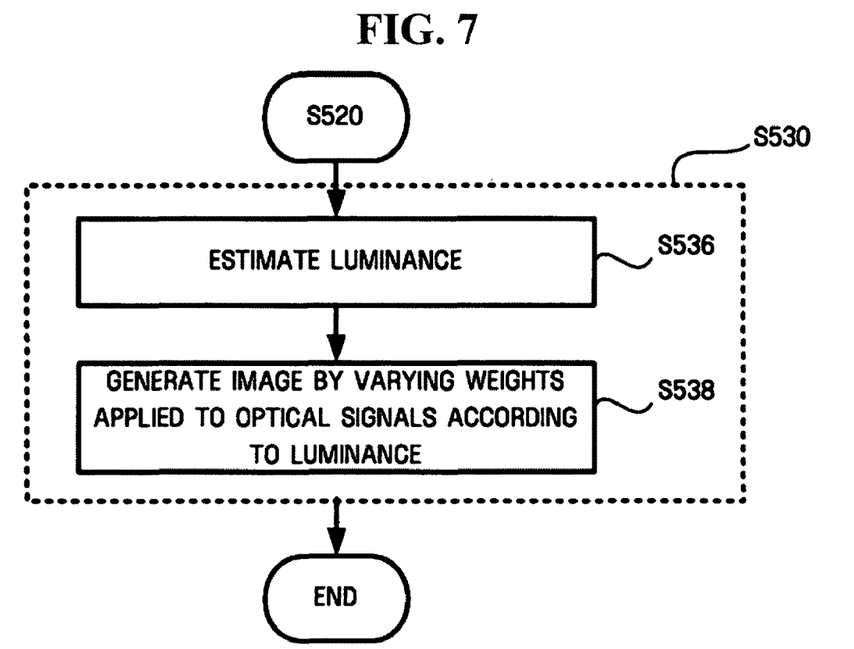
FIG. 7 is a flowchart illustrating operation S530 of FIG. 5, according to another exemplary embodiment.

FIG. 5 is a flowchart illustrating a method of generating an image according to an exemplary embodiment, FIG. 6 is a flowchart illustrating operation S530 of FIG. 5, according to an exemplary embodiment, and FIG. 7 is a flowchart illustrating operation S530 of FIG. 5, according to another exemplary embodiment.

Referring to FIG. 5, in operation S510, the optical module 110 receives optical signals, that are reflected from an object.

In operation S520, the filter module 120 filters the received optical signals using the wide-band filter area 122, which allows the transmission of optical signals within a wavelength band corresponding to a predetermined color, the narrow-band filter area 124, which allows the transmission of optical signals within a wavelength band corresponding to the predetermined color, and the all-pass filter area 126, which allows the transmission of optical signals in all wavelength bands. The wide-band filter area 122 may include at least one complementary color filter, i.e., at least one of a C filter, an M filter, and a Y filter. The narrow-band filter area 126 may include at least one of an R filter, a G filter, and a B filter. The all-pass filter area 126 may include a W filter. How the wide-band filter area 122, the narrow-band filter area 124, and the all-pass filter area 126 are arranged in the filter module 120 has already been described above with reference to FIG. 4, and a detailed description thereof will be skipped. However, the filter arrangement illustrated in FIG. 4 is exemplary. The arrangement and the positions and sizes of the wide-band filter area 122, the narrow-band filter area 124, and the all-pass filter area 126 in the filter module 120 may be altered in various manners.

In operation S530, the image generation module 130 generates an image by processing optical signals obtained by the filtering performed in operation S520. The image generation module 130 may apply different weights to optical signals that transmit through the wide-band filter area 122, the narrow-band filter area 124, and the all-pass filter area 126, respectively.

Operation S530 of FIG. 5 will hereinafter be described in further detail with reference to FIGS. 6 and 7.

Referring to FIG. 6, in operation S532, the shadow image generation unit 132 generates a demosaicked shadow image by applying a greater weight to optical signals that transmit through the wide-band filter area 122 than to optical signals that transmit through the narrow-band filter area 124, and the highlight image generation unit 134 generates a demosaicked highlight image by applying a greater weight to the optical signals that transmit through the narrow-band filter area 124 than to the optical signals that transmit through the wide-band filter area 122.

In operation S534, the blending unit 136 blends the shadow image and the highlight image generated in operation S532, and performs subsequent processes such as color conversion, white balancing, and gamma correction on an image obtained by the blending, thereby generating an image that can be displayed by a display module.

Alternatively, referring to FIG. 7, in operation S536, luminance is estimated using optical signals obtained by the filtering performed in operation S520. In operation S538, the adaptive image generation unit 138 generates an image by varying a weight applied to optical signals that transmit through the wide-band filter area 122 or a weight applied to optical signals that transmit through the narrow-band filter area 124 according to whether the estimated luminance is high or low, and performs the above-mentioned post subsequent processes on the generated image, thereby generating an image that can be displayed by a display module. More specifically, if the estimated luminance is low, the adaptive image generation unit 138 may apply a greater weight to optical signals that transmit through the wide-band filter area 122 than to optical signals that transmit through the narrow-band filter area 124. On the other hand, if the estimated luminance is high, the adaptive image generation unit 138 may apply a greater weight to the optical signals that transmit through the narrow-band filter area 124 than to the optical signals that transmit through the wide-band filter area 122.

In addition to the above-described exemplary embodiments, exemplary embodiments can also be implemented by executing computer readable code/instructions in/on a medium/media, e.g., a computer readable medium/media. The medium/media can correspond to any medium/media permitting the storing of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter. In addition, code/instructions may include functional programs and code segments.

The computer readable code/instructions can be recorded in/on a medium/media in a variety of ways, with examples of the medium/media including magnetic storage media (e.g., floppy disks, hard disks, magnetic tapes, etc.), optical media (e.g., CD-ROMs, DVDs, etc.), magneto-optical media (e.g., floptical disks), and hardware storage devices (e.g., read only memory media, random access memory media, flash memories, etc.) The medium/media may also be storage media in a distributed network, so that the computer readable code/instructions are stored and executed in a distributed fashion. The computer readable code/instructions may be executed by one or more processors. The computer readable code/instructions may also be executed and/or embodied in at least one application specific integrated circuit (ASIC) or Field Programmable Gate Array (FPGA).

In addition, one or more software modules or one or more hardware modules may be configured in order to perform the operations of the above-described exemplary embodiments.

The term "module", as used herein, denotes, but is not limited to, a software component, a hardware component, a plurality of software components, a plurality of hardware components, a combination of a software component and a hardware component, a combination of a plurality of software components and a hardware component, a combination of a software component and a plurality of hardware components, or a combination of a plurality of software components and a plurality of hardware components, which performs certain tasks. A module may advantageously be configured to reside on the addressable storage medium/media and configured to execute on one or more processors. Thus, a module may include, by way of example, components, such as software components, application specific software components, object-oriented software components, class components and task components, processes, functions, operations, execution threads, attributes, procedures, subroutines, segments of program code, drivers, firmware, microcode, circuitry, data, databases, data structures, tables, arrays, and variables. The functionality provided for in the components or modules may be combined into fewer components or modules or may be further separated into additional components or modules. Further, the components or modules can operate at least one processor (e.g. central processing unit (CPU)) provided in a device. In addition, examples of a hardware components include an application specific integrated circuit (ASIC) and Field Programmable Gate Array (FPGA). As indicated above, a module can also denote a combination of a software component(s) and a hardware component(s). These hardware components may also be one or more processors.

The computer readable code/instructions and computer readable medium/media may be those specially designed and constructed for the purposes of embodiments, or they may be of the kind well-known and available to those skilled in the art of computer hardware and/or computer software.

As described above, the apparatus, method, and medium for generating an image according to embodiments provide the following advantages.

First, it is possible to generate an HDR image using an image obtained by a single exposure and using a color filter array (CFA).

Second, it is possible to improve the sensitivity of an image by increasing the amount of light that arrives at a predetermined pixel using a CFA including a primary color filter, a complementary color filter, which is of a complementary color of the color of the primary color filter, and a W filter.

Third, it is possible to generate HDR image without a requirement of an expensive HDR sensor.

Although a few exemplary embodiments have been shown and described, it would be appreciated by those skilled in the art that changes may be made in these exemplary embodiments without departing from the principles and spirit of embodiments, the scope of which is defined in the claims and their equivalents.

What is claimed is:

1. An apparatus for generating an image, the apparatus comprising:
   an optical module to collect optical signals;
   a filter module which comprises a wide-band filter area that allows transmission of optical signals within a wavelength band corresponding to a complementary color of a predetermined color, a narrow-band filter area that allows transmission of optical signals within a wavelength band corresponding to the predetermined color, and an all-pass filter area that allows transmission of optical signals in all wavelength bands; and
   an image generation module to generate an image by processing optical signals transmitted through the filter module,
   wherein the image generation module applies different weights to optical signals according to which of the wide-band filter area, the narrow-band filter area, and the all-pass filter area that the optical signals are respectively transmitted through, and
   wherein the image generation module comprises:
      a shadow image generation unit to generate a demosaicked image by applying a greater weight to optical signals that transmit through the wide-band filter area than to optical signals that transmit through the narrow-band filter area.

2. The apparatus of claim 1, wherein the wide-band filter area comprises at least one complementary color filter, the complementary color filter being a cyan (C) filter, a magenta (M) filter, or a yellow (Y) filter.

3. The apparatus of claim 1, wherein the narrow-band filter area comprises at least one primary color filter, the primary color filter being a red (R) filter, a green (G) filter, or a blue (B) filter.

4. The apparatus of claim 1, wherein the all-pass filter area comprises a white (W) filter.

5. The apparatus of claim 1, wherein the filter module is constituted by a plurality of filter zones, each filter zone comprising:
   a first filter region which is a 2*2 pixel region comprising narrow-band filters P1, P2, and P3 belonging to different wavelength bands and an all-pass filter W; and
   a second filter region which is a 2*2 pixel region comprising wide-band filters C1, C2, and C3 belonging to different wavelength bands and an all-pass filter W.

6. The apparatus of claim 1, wherein the image generation module further comprises:
   a highlight image generation unit to generate a demosaicked image by applying a greater weight to the optical signals that transmit through the narrow-band filter area than to the optical signals that transmit through the wide-band filter area; and
   a blending unit to blend the demosaicked image generated by the shadow image generation unit and the demosaicked image generated by the highlight image generation unit.

7. An apparatus for generating an image, the apparatus comprising:
   an optical module to collect optical signals;
   a filter module which comprises a wide-band filter area that allows transmission of optical signals within a wavelength band corresponding to a complementary color of a predetermined color, a narrow-band filter area that allows transmission of optical signals within a wavelength band corresponding to the predetermined color, and an all-pass filter area that allows transmission of optical signals in all wavelength bands; and
   an image generation module to generate an image by processing optical signals transmitted through the filter module,
   wherein the image generation module applies different weights to optical signals according to which of the wide-band filter area, the narrow-band filter area, and the all-pass filter area that the optical signals are respectively transmitted through, and
   wherein the image generation module comprises an adaptive image generation unit to generate an image by varying a weight applied to optical signals that transmit through the wide-band filter area or a weight applied to optical signals that transmit through the narrow-band filter area according to luminance.

8. The apparatus of claim 7, wherein the adaptive image generation unit generates an image by applying a greater weight to the optical signals that transmit through the wide-band filter area than to the optical signals that transmit through the narrow-band filter area if the luminance is low; and applying a greater weight to the optical signals that transmit through the narrow-band filter area than to the optical signals that transmit through the wide-band filter area if the luminance is high.

9. The apparatus of claim 7, wherein the luminance is estimated using optical signals that transmit through the all-pass filter area.

10. The apparatus of claim 7, wherein the wide-band filter area comprises at least one complementary color filter, the complementary color filter being a cyan (C) filter, a magenta (M) filter, or a yellow (Y) filter.

11. The apparatus of claim 7, wherein the narrow-band filter area comprises at least one primary color filter, the primary color filter being a red (R) filter, a green (G) filter, or a blue (B) filter.

12. The apparatus of claim 7, wherein the all-pass filter area comprises a white (W) filter.

13. The apparatus of claim 7, wherein the filter module is constituted by a plurality of filter zones, each filter zone comprising:
a first filter region which is a 2*2 pixel region comprising narrow-band filters P1, P2, and P3 belonging to different wavelength bands and an all-pass filter W; and
a second filter region which is a 2*2 pixel region comprising wide-band filters C1, C2, and C3 belonging to different wavelength bands and an all-pass filter W.

14. A method for generating an image, the method comprising:
receiving optical signals that are reflected from an object;
filtering the received optical signals using a wide-band filter area which allows transmission of optical signals within a wavelength band corresponding to a complementary color of a predetermined color, a narrow-band filter area which allows transmission of optical signals within a wavelength band corresponding to the predetermined color, and an all-pass filter area which allows transmission of optical signals in all wavelength bands; and
generating an image by processing optical signals obtained by the filtering, wherein the generation comprises:
applying different weights to the received optical signals according to which of the wide-band filter area, the narrow-band filter area, and the all-pass filter area the received optical signals respectively transmit through;
generating a demosaicked shadow image by applying a greater weight to optical signals that transmit through the wide-band filter area than to optical signals that transmit through the narrow-band filter area.

15. The method of claim 14, wherein the wide-band filter area comprises at least one complementary color filter, the complementary color filter being a cyan (C) filter, a magenta (M) filter, or a yellow (Y) filter.

16. The method of claim 14, wherein the narrow-band filter area comprises at least one primary color filter, the primary color filter being red (R) filter, a green (G) filter, or a blue (B) filter.

17. The method of claim 14, wherein the all-pass filter area comprises a white (W) filter.

18. The method of claim 14, wherein the wide-band filter area, the narrow-band filter area, and the all-pass filter area constitute a plurality of filter zones, each filter zone comprising:
a first filter region which is a 2*2 pixel region comprising narrow-band filters P1, P2, and P3 belonging to different wavelength bands and an all-pass filter W; and
a second filter region which is a 2*2 pixel region comprising wide-band filters C1, C2, and C3 belonging to different wavelength bands and an all-pass filter W.

19. The method of claim 14, wherein the generation further comprises:
generating a demosaicked highlight image by applying a greater weight to the optical signals that transmit through the narrow-band filter area than to the optical signals that transmit through the wide-band filter area; and
blending the demosaicked shadow image and the demosaicked highlight image.

20. At least one non-transitory computer readable medium storing computer readable instructions that control at least one processor to implement the method of claim 14.

21. A method for generating an image, the method comprising:
receiving optical signals that are reflected from an object;
filtering the received optical signals using a wide-band filter area which allows transmission of optical signals within a wavelength band corresponding to a complementary color of a predetermined color, a narrow-band filter area which allows transmission of optical signals within a wavelength band corresponding to the predetermined color, and an all-pass filter area which allows transmission of optical signals in all wavelength bands;
generating an image by processing optical signals obtained by the filtering, wherein the generation comprises:
applying different weights to the received optical signals according to which of the wide-band filter area, the narrow-band filter area, and the all-pass filter area the received optical signals respectively transmit through;
estimating luminance; and
varying a weight applied to optical signals that transmit through the wide-band filter area or a weight applied to optical signals that transmit through the narrow-band filter area according to the luminance.

22. The method of claim 21, wherein generating the image comprises generating the image by applying a greater weight to the optical signals that transmit through the wide-band filter area than to the optical signals that transmit through the narrow-band filter area if the luminance is low; and applying a greater weight to the optical signals that transmit through the narrow-band filter area than to the optical signals that transmit through the wide-band filter area if the luminance is high.

23. The method of claim 21, wherein the estimation comprises estimating the luminance using optical signals that transmit through the all-pass filter area.

24. The method of claim 21, wherein the wide-band filter area comprises at least one complementary color filter, the complementary color filter being a cyan (C) filter, a magenta (M) filter, or a yellow (Y) filter.

25. The method of claim 21, wherein the narrow-band filter area comprises at least one primary color filter, the primary color filter being red (R) filter, a green (G) filter, or a blue (B) filter.

26. The method of claim 21, wherein the all-pass filter area comprises a white (W) filter.

27. The method of claim 21, wherein the wide-band filter area, the narrow-band filter area, and the all-pass filter area constitute a plurality of filter zones, each filter zone comprising:
a first filter region which is a 2*2 pixel region comprising narrow-band filters P1, P2, and P3 belonging to different wavelength bands and an all-pass filter W; and
a second filter region which is a 2*2 pixel region comprising wide-band filters C1, C2, and C3 belonging to different wavelength bands and an all-pass filter W.

28. At least one non-transitory computer readable medium storing computer readable instructions that control at least one processor to implement the method of claim 21.

29. An apparatus for generating an image, the apparatus comprising:
a filter module which comprises a wide-band filter area that allows transmission of optical signals within a wavelength band corresponding to a complementary color of a predetermined color, a narrow-band filter area that allows transmission of optical signals within a wavelength band corresponding to the predetermined color, and an all-pass filter area that allows transmission of optical signals in all wavelength bands; and an image generation module to generate an image by processing optical signals transmitted through the filter module, wherein the image generation module applies different weights to optical signals according to which of the wide-band filter area, the narrow-band filter area, and the all-pass filter area that the optical signals are respectively transmitted through, and wherein the image generation module comprises:

a shadow image generation unit to generate a demosaicked image by applying a greater weight to optical signals that transmit through the wide-band filter area than to optical signals that transmit through the narrow-band filter area.

30. A method for generating an image, the method comprising:

filtering optical signals using a wide-band filter area which allows transmission of optical signals within a wavelength band corresponding to a complementary color of a predetermined color, a narrow-band filter area which allows transmission of optical signals within a wavelength band corresponding to the predetermined color, and an all-pass filter area which allows transmission of optical signals in all wavelength bands; and generating an image by processing optical signals obtained by the filtering, wherein the generation comprises:

applying different weights to the received optical signals according to which of the wide-band filter area, the narrow-band filter area, and the all-pass filter area the received optical signals respectively transmit through;

generating a demosaicked shadow image by applying a greater weight to optical signals that transmit through the wide-band filter area than to optical signals that transmit through the narrow-band filter area.

31. At least one non-transitory computer readable medium storing computer readable instructions that control at least one processor to implement the method of claim 30.

* * * * *

UNITED STATES PATENT AND TRADEMARK OFFICE
CERTIFICATE OF CORRECTION

Page 1 of 1

PATENT NO.       : 8,031,243 B2
APPLICATION NO.  : 11/822551
DATED            : October 4, 2011
INVENTOR(S)      : Francisco Imai et al.

It is certified that error appears in the above-identified patent and that said Letters Patent is hereby corrected as shown below:

ON THE TITLE PAGE:
Item (75) Inventors: Line 2, Delete "Gyeongiu-si" and insert -- Gyeongju-si --, therefor.

IN THE CLAIMS:
Column 12, Line 16, In Claim 21, after "bands;" insert -- and --.

Signed and Sealed this
Thirty-first Day of January, 2012

David J. Kappos
*Director of the United States Patent and Trademark Office*